(12) United States Patent
Greger

(10) Patent No.: US 10,066,100 B2
(45) Date of Patent: Sep. 4, 2018

(54) COPOLYESTER/CONTROLLED DISTRIBUTION STYRENIC BLOCK COPOLYMER BLENDS AND METHODS OF MAKING AND USING SAME

(71) Applicant: KRATON POLYMERS U.S. LLC, Houston, TX (US)

(72) Inventor: Marcus Greger, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 63 days.

(21) Appl. No.: 15/259,845

(22) Filed: Sep. 8, 2016

(65) Prior Publication Data

US 2017/0066920 A1  Mar. 9, 2017

Related U.S. Application Data

(60) Provisional application No. 62/215,474, filed on Sep. 8, 2015.

(51) Int. Cl.
*C08L 53/02* (2006.01)
*C08L 67/02* (2006.01)

(52) U.S. Cl.
CPC .............. *C08L 67/02* (2013.01); *C08L 53/02* (2013.01)

(58) Field of Classification Search
CPC ......... C08L 67/02; C08L 53/02; C08L 67/025
See application file for complete search history.

(56) References Cited

U.S. PATENT DOCUMENTS

| | | | |
|---|---|---|---|
| 4,130,603 A | 12/1978 | Tanaka et al. | |
| 8,299,177 B2 | 10/2012 | Wright et al. | |
| 8,399,768 B2 | 3/2013 | Schmidt | |
| 2003/0176582 A1* | 9/2003 | Bening | C08F 287/00 525/242 |
| 2006/0283774 A1* | 12/2006 | Hasegawa | H01L 21/67369 206/725 |
| 2008/0015306 A1 | 7/2008 | Wright et al. | |
| 2009/0208720 A1* | 8/2009 | Miyamoto | C08L 67/02 428/220 |
| 2011/0184082 A1 | 7/2011 | Wright et al. | |
| 2014/0371377 A1 | 12/2014 | Salazar | |
| 2015/0125682 A1* | 5/2015 | Greger | C08L 53/00 428/217 |
| 2016/0039577 A1* | 2/2016 | Aagaard | B29D 99/0096 29/428 |

OTHER PUBLICATIONS

International Search Report dated Jan. 5, 2017 for PCT/US2016/050742, filed Oct. 18, 2017.
Taiwan Search Report dated Jun. 29, 2017 for TW Application No. 105129177, filed Sep. 8, 2016.

* cited by examiner

*Primary Examiner* — Jeffrey C Mullis
(74) *Attorney, Agent, or Firm* — Jessica Zimberlin Eastman; Cantor Colburn LLP

(57) ABSTRACT

A composition comprising (i) a controlled distribution styrenic block copolymer and (ii) a thermoplastic copolyester wherein the composition has a Shore A hardness of from about 50 to about 90 and a melt flow rate of from about 15 g/10 min. to about 50 g/10 min. as determined in accordance with ASTM D 1238.

20 Claims, 5 Drawing Sheets

COPOLYESTER/CONTROLLED DISTRIBUTION STYRENIC BLOCK COPOLYMER BLENDS AND METHODS OF MAKING AND USING SAME

CROSS-REFERENCE TO RELATED APPLICATIONS

The present application is a non-provisional of and claims priority to U.S. Provisional Patent Application No. 62/215,474 filed Sep. 8, 2015 and entitled "Styrenic Block Copolymers for Copolyester Modification," which application is incorporated by reference herein in its entirety.

TECHNICAL FIELD

The present disclosure is in the field of chemistry. More specifically, the present disclosure relates to compositions comprising blends of controlled distribution styrenic block copolymers and copolyesters.

BACKGROUND

Applications of copolyesters (COPE) are limited when low hardness (<22 Shore D) is a desired property. Commercially lower hardness and higher melt flow within copolyesters blends can be achieved by adding oil into these types of compounds. However, this is not always desired depending on the application and can have a significant influence on other properties. Thus, an ongoing need exists for copolyester blends having a desired combination of hardness and melt flow.

SUMMARY

Disclosed herein is a composition comprising (i) a controlled distribution styrenic block copolymer and (ii) a thermoplastic copolyester wherein the composition has a Shore A hardness of from about 50 to about 90 and a melt flow rate of from about 15 g/10 min. to about 50 g/10 min. as determined in accordance with ASTM D 1238.

Also disclosed herein is an overmoulding prepared from a composition comprising (i) a controlled distribution styrenic block copolymer and (ii) a thermoplastic copolyester wherein the composition has a Shore A hardness of from about 50 to about 90 and a melt flow rate of from about 15 g/10 min. to about 50 g/10 min. as determined in accordance with ASTM D 1238.

DETAILED DESCRIPTION

Figure 1:
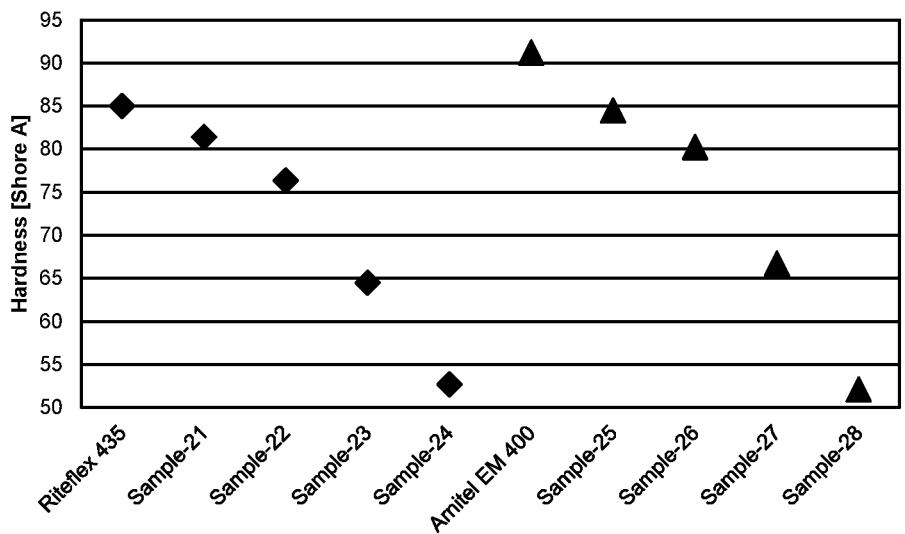
FIG. 1 is a graph of composition hardness of as a function of styrenic polymer addition for the samples of Example 1.

Molecular weights described herein are polystyrene equivalent molecular weights and can be measured by Gel Permeation Chromatography (GPC), where the GPC system has been appropriately calibrated. Polymers of known molecular weight are used for calibration and these must be of the same molecular structure and chemical.

Herein the "hardness" of the polymer refers to the material's resistance to permanent indentation. The hardness may be determined using a Shore durometer in accordance with ISO 868 entitled "Plastics and Ebonite—Determination of Indentation Hardness by Means of a Durometer (Shore Hardness). The term "ISO 868" as used herein refers to the standard method for the determination of the indentation hardness of plastics and ebonite by means of durometers of two types: type A is used for softer materials and type D for harder materials. The method permits measurements of either the initial indentation or of the indentation after the specified period of time, or both. This test method was published on, the contents of which are incorporated herein by reference in their entirety. Throughout the present description and claims, all the standard Shore A hardness measurements were performed on injection molded plates at 10 seconds using Type A durometer.

The polystyrene content (PSC) in controlled distribution styrenic block copolymers of the present disclosure may be determined using any suitable methodology such as proton nuclear magnetic resonance (NMR).

One or more of the following analytical methodologies were employed in evaluation of the disclosed compositions:

ASTM D 1238 is entitled "Test Method for Melt Flow Rates of Thermoplastics by Extrusion Plastometer." The term "ASTM D 1238" as used herein refers to the standard test method for determining melt flow rates of thermoplastics by extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Feb. 1, 2010 and published in March, 2010, the contents of which are incorporated herein by reference in their entirety. Throughout the present description and claims, all the standard melt index values are measured according to ASTM D 1238, using a piston load of 2.16 kg and at a temperature of 230 degrees Celsius.

ASTM D 638-10 is entitled "Standard Test Method for Tensile Properties of Plastics." The term "ASTM D 638-10" as used herein refers to the standard test method for determining the tensile properties of unreinforced and reinforced plastics in the form of standard dumbbell-shaped test specimens when tested under defined conditions of pretreatment, temperature, humidity, and testing machine speed. This test method was approved on May 15, 2010 and published June, 2010, the contents of which are incorporated herein by reference in their entirety. Throughout the present description and claims, some tensile properties were determined on specimens type D412-72 Type D with a cross-head speed of 10 inches/min according to ASTM D 638-10.

DIN 53504 is entitled "Testing of Rubber—Determination of Tensile Strength at Break, Tensile Stress at Yield, Elongation at Break and Stress Values in a Tensile Test." The term "DIN 53504" as used herein refers to the standard test for the determination of the tensile strength at break, tensile stress at yield, elongation at break and stress at a given strain of rubber test pieces of specified shape when these are stretched to rupture at a constant rate of traverse. This test method was published October, 2009, the contents of which are incorporated herein by reference in their entirety. Throughout the description and claims, where specified, tensile properties were measured on S2-specimens with a cross-head speed of 200 mm/min. The shape of the tensile bar was similar to Specimen 5A of test method DIN EN ISO 527-2 and according to DIN 53504 suitable for thermoplastic elastomers. The specimens were cut out of injection molded plates prior to testing. For the referenced DIN standards, visit the Deutsches Institut für Normung E. V. (DIN) website, www.din.de.

ASTM D 624 is entitled "Standard Test Method for Tear Strength of Conventional Vulcanized Rubber and Thermoplastic Elastomers." The term "ASTM D 624" as used herein refers to the standard method for determining the tear strength that can be influenced by stress-induced anisotropy, stress distribution, strain rate, and test piece size. This test method was approved on Jan. 1, 2012 and published March, 2012, the contents of which are incorporated herein by reference in their entirety. Throughout the present description and claims, all the tear strength properties were determined using specimens D 624-54 Type C with a cross-head speed of 10 inches/min. The test specimens were cut out of injection molded plates prior to testing.

ASTM D 3389 is entitled "Standard Test Method for Coated Fabrics Abrasion Resistance (Rotary Platform Abrader)." The term "ASTM D 3389" as used herein refers to the standard method for determining the wear resistance properties of a materials coated with rubber or plastics to abrasion. Such properties may be correlated to expected end use performance. This test method was published on Jul. 1, 2015, the contents of which are incorporated herein by reference in their entirety. Throughout the present description and claims, the wear abrasion was measured on injection molded plates based on 1,000 cycles and 500 gram weight. The weight of the plate was determined before and after the abrasion test and the loss in weight of the injection plate, if any, was measured.

ASTM D 1894 is entitled "Standard Test Method for Static and Kinetic Coefficients of Friction of Plastic Film and Sheeting." The term "ASTM D 1894" as used herein refers to the standard method for the determination of the coefficients of starting and sliding friction of plastic film and sheeting when sliding over itself or other substances as specified test conditions. The procedure permits the use of a stationary sled with a moving plane, or a moving sled with a stationary plane. Both procedures yield the same coefficients of friction values for a given sample. This test method was approved on Sep. 1, 2011 and published September, 2011, the contents of which are incorporated herein by reference in their entirety. Throughout the present description and claims, the difference of the neat copolyesters and the optimized copolyester/polymer blends was determined by measuring the static coefficient of friction using ASTM D 1894.

ASTM D 3835 is entitled "Standard Test Method for Determination of Properties of Polymeric Materials by Means of a Capillary Rheometer." The term "ASTM D 3835" as used herein refers to the standard test method for the determination of rheological properties of polymeric materials at various temperatures and shear rates common to processing equipment. This method can be used to measure melt viscosity, sensitivity, or stability of melt viscosity with respect to temperature and polymer dwell time in the rheometer, die swell ratio, and shear sensitivity when extruding under constant rate or stress. This test method was approved on Dec. 1, 2008 and published December, 2008, the contents of which are incorporated herein by reference in their entirety. Throughout the description and claims, the capillary viscosity was determined at 230 degrees Celsius using a die with a diameter of 1.0 mm and a length of 20 mm.

ISO 8510-2:2006 is entitled "Adhesives—Peel Test for a Flexible-Bonded-to-Rigid Test Specimen Assembly—Part 2: 180 degrees." The term "ISO 8510-2:2006" as used herein refers to the standard test method for the determination, under specified conditions, of the peel resistance of a bonded assembly of two adherends where one adherend is flexible and the other is rigid. This test method was approved and published in December, 2010.

For the referenced ISO standards, visit the ISO website, www.iso.org. For the referenced ASTM standards, visit the ASTM website, www.astm.org, or contact ASTM Customer Service at service@astm.org.

Disclosed herein are compositions comprising i) a controlled distribution styrenic block copolymer, and ii) a COPE. In an aspect, the compositions result in a blend of materials having a desired combination of hardness and flow characteristics in the absence of a flow promoter or plasticizer such as an oil. For example, the oil may be a mineral-based oil such as Treated Distilled aromatic extract (TDAE), Mild Extract Solvate (WS), Residual Aromatic Extract (RAE), Treated Aromatic Extract (TAE), naphthenic oil, white oil, or black naphthenic oil, and vegetable oils such as sunflower oil, carnauba oil, linseed oil, rape seed oil and its derivatives from vegetable fatty acid and tall oil fatty acids.

Hereinafter such compositions are termed high-flow copolyester/controlled distribution styrenic block copolymer blends and designated HF-CSB.

In an aspect, the HF-CSB comprises a controlled distribution styrenic block copolymer. In an aspect, the controlled distribution styrenic block copolymer is an A-EB/A-A and/or an $(A-EB/A)_nX$ block copolymer. In such aspects, the "A" block comprises an alkenyl arene, such as styrene, alpha-methylstyrene, para-methylstyrene, vinyl toluene, vinylnaphthalene, para-butyl styrene or combinations thereof. In such aspects, the "B" block comprises a controlled distribution copolymer of at least one mono alkenyl arene with at least one conjugated diene such as 1,3-butadiene and substituted butadienes such as isoprene, piperylene, 2,3-dimethyl-1,3-butadiene, and 1-phenyl-1,3-butadiene, or combinations thereof. It is to be understood that in the designations A-EB/A-A or $(A-EB/A)_nX$, "E" refers to a diene which has been hydrogenated and thus becomes ethylene/butylene (EB). Hydrogenation of the controlled distribution styrenic block copolymer will be discussed in more detail later herein.

In an aspect, the controlled distribution styrenic block copolymer of the present disclosure contains mono alkenyl arene end blocks and a unique midblock of a mono alkenyl arene, and a conjugated diene. The combination of (1) a unique control for the monomer addition and (2) the use of diethyl ether or other modifiers as a component of the solvent (which will be referred to as "distribution agents") results in a certain characteristic distribution of the two monomers (herein termed a "controlled distribution" polymerization, i.e., a polymerization resulting in a "controlled distribution" structure), and also results in the presence of certain mono alkenyl arene rich regions and certain conjugated diene rich regions in the polymer block.

For purposes herein, a "controlled distribution" refers to a molecular structure having the following attributes: (1) terminal regions adjacent to the mono alkenyl arene homopolymer ("A") blocks that are rich in (i.e., have a greater than average amount of) conjugated diene units; (2) one or more regions not adjacent to the A blocks that are rich in (i.e., have a greater than average amount of) mono alkenyl arene units; and (3) an overall structure having relatively low blockiness. For the purposes herein, "rich in" is defined as greater than about 5 wt. % above the average amount.

The relatively low blockiness of the overall structure can be shown by either the presence of only a single ("$T_g$,") intermediate between the $T_g$'s of either monomer alone, when analyzed using differential scanning calorimetry ("DSC") (thermal) methods or via mechanical methods, or as shown via proton nuclear magnetic resonance ("H-NMR") methods. The potential for blockiness can also be inferred from measurement of the UV-Visible absorbance in a wavelength range suitable for the detection of polystyryllithium end groups during polymerization of the B block. A sharp and substantial increase in this value is indicative of a substantial increase in polystyryllithium chain ends. In this process, this will only occur if the conjugated diene concentration drops below the critical level to maintain controlled distribution polymerization. Any styrene monomer that is present at this point will add in a blocky fashion.

The term "styrene blockiness", as measured using proton NMR (H-NMR), is defined to be the proportion of S units in the polymer having two S nearest neighbors on the polymer chain. The styrene blockiness may be determined after using H-NMR to measure two experimental quantities as follows. First, the total number of styrene units (i.e. arbitrary instrument units which cancel out) is determined by integrating the total styrene aromatic signal in the H-NMR spectrum from 7.5 to 6.2 ppm and dividing this quantity by 5 to account for the 5 aromatic hydrogens on each styrene aromatic ring. Second, the blocky styrene units are determined by integrating that portion of the aromatic signal in the H-1 NMR spectrum from the signal minimum between 6.88 and 6.80 to 6.2 ppm and dividing this quantity by 2 to account for the 2 ortho hydrogens on each blocky styrene aromatic ring. The assignment of this signal to the two ortho hydrogens on the rings of those styrene units which have two styrene nearest neighbors was reported in F. A. Bovey, High Resolution NMR of Macromolecules (Academic Press, New York and London, 1972), Chapter 6. The styrene blockiness is simply the percentage of blocky styrene to total styrene units which is calculated as follows: Blocky %=100 times (Blocky Styrene Units/Total Styrene Units). Expressed thus, Polymer-Bd-S-(S)n-S-Bd-Polymer, where n is greater than zero is defined to be blocky styrene. For example, if n equals 8 in the expression, then the blockiness index would be 80%. In an aspect of the present disclosure, styrenic polymers suitable for use in the present disclosure have a blockiness index of less than about 40. For some polymers, having styrene contents of from about 10 wt. % to about 40 wt. % the blockiness index can be less than about 10.

In aspects of the present disclosure, the controlled distribution styrenic block copolymer has three distinct regions—conjugated diene rich regions on the end of the block and a mono alkenyl arene rich region near the middle or center of the block. Typically the region adjacent to the A block comprises the first 15 to 25%, and all points in-between, of the block and comprises the diene rich region(s), with the remainder considered to be arene rich. The term "diene rich" means that the region has a measurably higher ratio of diene to arene than the arene rich region. In an aspect, the controlled distribution styrenic block copolymer is a mono alkenyl arene/conjugated diene, wherein the proportion of mono alkenyl arene units increases gradually to a maximum near the middle or center of the block (when describing an ABA structure) and then decreases gradually until the polymer block is fully polymerized.

Starting materials for preparing the controlled distribution styrenic block copolymer of the present disclosure include the initial monomers. In an aspect, the alkenyl arene comprises styrene, alpha-methylstyrene, para-methylstyrene, vinyl toluene, vinylnaphthalene, and para-butyl styrene or combinations thereof. In an aspect, the conjugated dienes comprises 1,3-butadiene and substituted butadienes such as isoprene, piperylene, 2,3-dimethyl-1,3-butadiene, and 1-phenyl-1,3-butadiene, or combinations thereof. As used herein, and in the claims, "butadiene" refers specifically to "1,3-butadiene."

In an aspect, a controlled distribution styrenic block copolymer suitable for use in the present disclosure has true number average molecular weight of from about 3,000 g/mol to about 60,000 g/mol for the mono alkenyl arene A block, and from about 30,000 g/mol to about 300,000 g/mol for the controlled distribution conjugated diene/mono alkenyl arene B block. In an alternative aspect, the controlled distribution styrenic block copolymer has true number average molecular weight from about 5000 g/mol to about 45,000 g/mol for the A block and from about 50,000 g/mol to about 250,000 g/mol for the B block. Alternatively, in the controlled distribution styrenic block copolymer the A block may have a true number average molecular weight of from about 3,000 g/mol to about 60,000 g/mol, or alternatively from about 5000 g/mol to about 45,000 g/mol, while the B block for the sequential block may have a true number average molecular weight of from about 30,000 g/mol to about 300,000 g/mol, In an aspect, the total average molecular weight for the controlled distribution styrenic block copolymer may be from about 40,000 g/mol to about 400,000 g/mol, and for the radial copolymer from about 60,000 g/mol to about 600,000 g/mol.

The microstructure or vinyl content of the conjugated diene in the controlled distribution styrenic block copolymer may be controlled to provide some user or process-desired vinyl content. The term "vinyl content" refers to the fact that a conjugated diene is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The term "vinyl" refers to the presence of a pendant vinyl group on the polymer chain. In an aspect, about 20 to about 80 mol percent of the condensed butadiene units in the B block have 1,2 vinyl configuration as determined by H-NMR analysis, alternatively about 30 to about 80 mol percent of the condensed butadiene units should have 1,2-vinyl configuration based on the total mol percent of the condensed butadiene units.

For the controlled distribution or B block the weight percent of mono alkenyl arene in each B block is between about 10 weight percent and about 75 weight percent, alternatively between about 25 weight percent and about 50 weight percent based on the total weight of the block copolymer.

In an aspect, the controlled distribution styrenic block copolymer suitable for use in the present disclosure can be hydrogenated using any suitable methodology. Hydrogenation of the styrenic copolymer may be carried out to result in the reduction of at least about 90%, or alternatively greater than about 95% of the conjugated diene double bonds with concomitant reduction of from about 0 to about 10% the arene double bonds.

In an aspect, the controlled distribution styrenic block copolymer suitable for use in the present disclosure has a Shore A hardness of from about 20 to about 90.

A controlled distribution styrenic block copolymer of the present disclosure may include the copolymer sold under the trade name Kraton A® by Kraton Polymers.

In an aspect, the HF-CSB comprises a copolyester elastomer (COPE). As discussed above, polyester-based thermoplastic elastomers may be used to form the compositions of this disclosure. In general, "thermoplastic elastomers" refer to a class of polymers having thermoplastic-like (softens when exposed to heat and returns to original condition when cooled) properties and elastomeric-like (can be stretched and then returns to original condition when released) properties. In thermoplastic elastomer block copolymers, there are some blocks having thermoplastic-like properties and these blocks may be referred to as "hard" segments. Also, there are some blocks having elastomeric-like properties and these blocks may be referred to as "soft" segments. The ratio of hard to soft segments and the composition of the segments influence the properties of the resulting thermoplastic elastomer.

One example of a suitable polyester thermoplastic elastomer that can be used to form the compositions of this disclosure is polyester-polyether block copolymers. In general, these block copolymers contain hard and soft segments having various lengths and sequences. The hard, crystalline polyester segments are normally derived from reacting an aromatic-containing dicarboxylic acid or diester such as, for example, terephthalic acid, dimethyl terephthalate, and the like with a diol containing about 2 to about 10 carbon atoms. For example, the hard segments may constitute butylene terephthalate, tetramethylene terephthalate, or ethylene terephthalate units. The soft, elastomeric segments are normally derived from long or short-chain poly(alkylene oxide) glycols containing a total of about 3 to about 12 carbon atoms including up to 3 or 4 oxygen atoms with the remaining atoms being hydrocarbon atoms. Useful poly(alkylene oxide) glycols include, for example, and without limitation poly(oxyethylene)diol, poly(oxypropylene)diol, and poly(oxytetramethylene)diols. More particularly, the polyether polyols have been based on polymers derived from cyclic ethers such as ethylene oxide, 1,2-propylene oxide and tetrahydrofuran. When these cyclic ethers are subjected to ring opening polymerization, they provide the corresponding polyether glycol, for example, polyethylene ether glycol (PEG), poly(1,2-propylene) glycol (PPG), and polytetramethylene ether glycol (PO4G, also referred to as PTMEG).

In an aspect, a polyester thermoplastic elastomer suitable for use in the present disclosure is RITEFLEX material, available from Ticona-Celanese Corp. The RITEFLEX TPC-ET products include different grades of polyester-polyether block copolymers, and examples of such materials and their respective properties are described in below Table 1. Another example of polyester-polyether block copolymer suitable for use in the present disclosure is commercially available under the trademark, HYTREL, from DuPont. The HYTREL polyester block copolymers are available in different grades and contain hard (crystalline) segments of polybutylene terephthalate and soft (amorphous) segments based on long-chain polyether glycols.

In an aspect, the HF-CSB comprises a blend of a controlled distribution styrenic block copolymer and COPE, both of the type disclosed herein. In such aspects, the HF-CSB may have the controlled distribution styrenic block copolymer present in an amount of from about 1 wt. % to about 99 wt. %, alternatively from about 9 wt. % to about 71 wt. %, or alternatively from about 21 wt. % to about 50 wt. % and the COPE may be present in an amount of from about 1 wt. % to about 99 wt. %, alternatively from about 29 wt. % to about 81 wt. %, or alternatively from about 50 wt. % to about 79 wt. % wherein the weight percentage is based on the total weight of the HF-CSB. In an aspect, the HF-CSB excludes a flow promoter or plasticizer such as oil.

In an aspect, the HF-CSB can comprise various other components to meet one or more user and/or process goals. Optionally, additives may be included to modify one or more properties of the HF-CSBs.

In an embodiment, the HF-CSBs optionally comprise an antioxidant. For example, antioxidants and other stabilizing ingredients can be added to protect the HF-CSB from degradation induced by heat, light and processing or during storage. Several types of antioxidants can be used, either primary antioxidants like hindered phenols or secondary antioxidants like phosphite derivatives or blends thereof. Examples of antioxidants suitable for use in the present disclosure are sterically hindered phenol type antioxidants such as IRGANOX 1010, liquid phenolic antioxidants such as IRGANOX L135 all of which are commercially available from BASF. Other examples include the antioxidants IRGANOX 1076 and IRGANOX 1035, both commercially available from BASF and MARK 2112, MARK 1500, and MARK 5014, commercially available from Witco.

In an embodiment, the HF-CSBs optionally comprise fillers. Examples of various fillers can be found in the 1971-1972 Modern Plastics Encyclopedia, pages 240-247. Fillers may be optionally present in an amount of from about 2 to about 80 percent by weight based on the total weight of the resulting reinforced blend. Coupling agents, such as various silanes, may be employed in the preparation of the reinforced blends. A reinforcement material may be defined simply as the material that is added to a resinous matrix to improve the strength of the polymer. Most of these reinforcing materials are inorganic or organic products of high molecular weight. Various examples include, but are not limited to, glass fibers, asbestos, boron fibers, carbon and graphite fibers, whiskers, quartz and silica fibers, ceramic fibers, metal fibers, natural organic fibers, and synthetic organic fibers.

Other optional additives may include UV absorbers, hindered amine light stabilizers, scratch additives, slip aids, colorants and processing oils. Each optional additive may be present in an amount of less than 5 percent by weight based on the total weight of the resulting blend.

The relative amounts of the various ingredients and additives will depend in part upon the particular end use.

In an aspect, a HF-CSB of the present disclosure has a Shore A hardness in the range of from about 50 to about 90, or alternatively from about 60 to about 80.

In an aspect, an article prepared from an HF-CSB of the present disclosure has a tear strength of from about 25 kN/m to about 145 kN/m. The tear strength is a measure of the resistance to rupture under a quasi-static load in normal direction of fracture.

In an aspect, a HF-CSB of the present disclosure has a melt flow rate of from about 1 g/10 min. to about 100 g/10 min., or alternatively from about 15 g/10 min. to about 50 g/10 min., or alternatively from about 30 g/10 min. to about 50 g/10 min. as determined in accordance with ASTM D 1238.

In an aspect, a HF-CSB of the present disclosure has a tensile strength at break in the range of from about 4 MPa to about 50 MPa, or alternatively from about 6 MPa to about 32 MPa, or alternatively from about 8 MPa to about 22 MPa, as determined in accordance with ASTM D 638-10.

In an aspect, a HF-CSB of the present disclosure has an elongation at break of about or greater than 200%, or alternatively from about 200% to about 1300%, as determined in accordance with DIN 53504.

In an aspect, a HF-CSB of the present disclosure has polystyrene content of from about 20 wt. % to about 60 wt. %, alternatively from about 30 wt. % to about 45 wt. %, or alternatively from about 32 wt. % to about 36 wt. % as determined by NMR techniques.

In an aspect, a HF-CSB of the present disclosure has static coefficient of friction of from about 0.15 to about 0.8 as determined in accordance with ASTM D1894. Herein the static coefficient of friction refers to the proportionality constant, f, relating the maximum amount of force required to translate one body relative to another body to cause incipient relative movement between the bodies (the maximum force of static friction, (F), to overcome a force (N) normal to the direction of movement and is mathematically given by f=F/N.

In an aspect, a HF-CSB of the present disclosure has a peel adhesion strength of from about 25 N/25 mm to about 300 N/25 mm, alternatively from about 40 N/25 mm to about 250 N/25 mm, or alternatively from about 60N/25 mm to about 200 N/25 mm using a peel speed of 200 mm/min. in accordance with ISO 8510-2. Peel adhesion herein refers to the force needed to "peel" an adhesive tape from any given surface, whether flexible, smooth, or rigid. This "peel" force is always and only measured across the width of the taped substrate, making it the more difficult separating force to resist.

In an aspect, a HF-CSB of the present disclosure comprises a copolyester wherein the copolyester has a Shore D hardness of from about 22 to about 60.

The HF-CSBs described herein are useful in a wide variety of applications including, for example, molded and extruded goods such as films, overmolded articles, foamed articles, wearable devices, household goods, fused deposition articles, toys, grips, handles, shoe soles, tubing, sporting goods, sealants, and gaskets.

EXAMPLES

The subject matter of the present disclosure having been generally described, the following examples are given as particular aspects of the disclosure and to demonstrate the practice and advantages thereof. It is understood that the examples are given by way of illustration and are not intended to limit the specification or the claims to follow in any manner.

Example 1

HF-CSBs of the type described herein were formulated as described in Tables 1-3 and prepared by twin screw extrusion. All formulations contained a similar amount of standard antioxidants. All ingredients were dried overnight and dry blended prior to extrusion. Formulating ingredients included Polymer X which is a controlled distribution styrenic block copolymer of the type disclosed herein, Riteflex™ 425 (thermoplastic copolyester, MFR of 30 g/10 min., 76 Shore A) or Riteflex 447 (thermoplastic copolyester, MFR of 14 g/10 min., 96 Shore A). RITEFLEX thermoplastic copolyester is commercially available from Celenase corporation. Formulations in Table 2 include Polymer X, Arnitel™ EL250 (thermoplastic copolyester, MFR of 39 g/10 min., 84 Shore A), Arnitel EM400 (thermoplastic copolyester, MFR of 36 g/10 min., 91 Shore A) or Arnitel EM550 (thermoplastic copolyester, MFR of 9 g/10 min., 97 Shore A). ARNITEL thermoplastic copolyester is commercially available from Koninklijke DSM N.V. Formulations in Table 3 include Polymer X, Hytrel™ 3046 (thermoplastic copolyester, MFR of 31 g/10 min., 84 Shore A), Hytrel 4056 (thermoplastic copolyester, MFR of 13 g/10 min., 94 Shore A) or Hytrel 5526 (thermoplastic copolyester, MFR of 25 g/10 min., 97 Shore A). HYTREL thermoplastic copolyester is commercially available from DuPont.

The melt flow rates of all copolyesters and all blends were tested according to ASTM D1238 at 230° C./2.16 kg. Shore A hardness was tested according ISO 868 on injection molded plates at 10 seconds. All polymers were dried overnight prior to injection molding. Tensile properties were measured according to DIN 53504 on S2-specimens with a cross-head speed of 200 mm/min. The shape of the tensile bar was similar to specimen 5A from DIN EN ISO 527-2 and according to DIN 53504 suitable for thermoplastic elastomers. The specimens were cut out of injection molded plates prior to testing.

TABLE 1

| | Sample No. | | | |
|---|---|---|---|---|
| | 1 | 2 | 5 | 6 |
| Riteflex 425 | 74.55 wt. % | 49.70 wt. % | | |
| Riteflex 447 | | | 74.55 wt. % | 49.70 wt. % |
| Polymer X | 24.85 wt. % | 49.70 wt. % | 24.85 wt. % | 49.70 wt. % |

TABLE 2

| Sample No. | 7 | 8 | 9 | 10 | 11 | 12 |
|---|---|---|---|---|---|---|
| Arnitel EL250 | 74.55 wt. % | 49.70 wt. % | | | | |
| Arnitel EM400 | | | 74.55 wt. % | 49.70 wt. % | | |
| Arnitel EM550 | | | | | 74.55 wt. % | 49.70 wt. % |
| Polymer X | 24.85 wt. % | 49.70 wt. % | 24.85 wt. % | 49.70 wt. % | 24.85 wt. % | 49.70 wt. % |

TABLE 3

| Sample No. | 13 | 14 | 15 | 16 | 17 | 18 |
|---|---|---|---|---|---|---|
| Hytrel 3046 | 74.55 wt. % | 49.70 wt. % | | | | |
| Hytrel 4056 | | | 74.55 wt. % | 49.70 wt. % | | |
| Hytrel 5526 | | | | | 74.55 wt. % | 49.70 wt. % |
| Polymer X | 24.85 wt. % | 49.70 wt. % | 24.85 wt. % | 49.70 wt. % | 24.85 wt. % | 49.70 wt. % |

Figure 2:
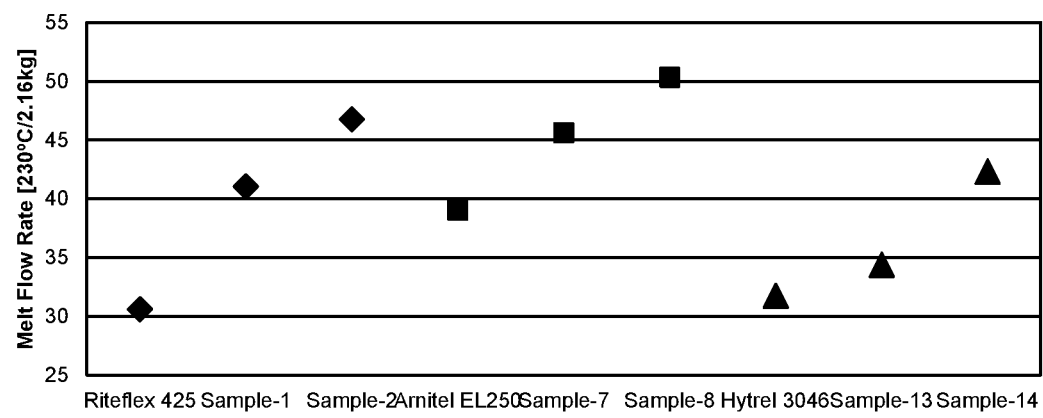
FIG. 2 is a graph of melt flow rate as a function of styrenic polymer addition for the samples of Example 1.
Figure 3:
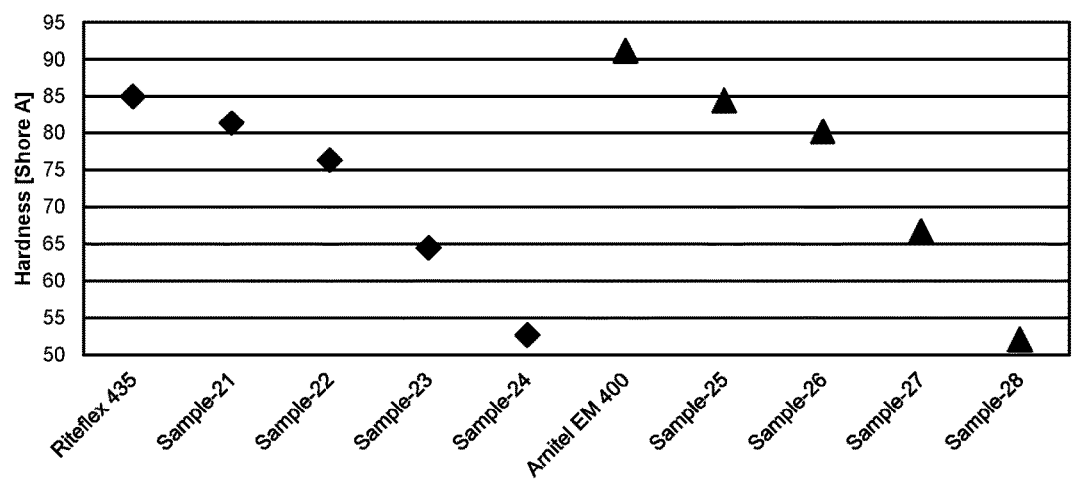
FIG. 3 is a graph of composition hardness as a function of styrenic polymer addition for the samples of Example 2.
Figure 4:
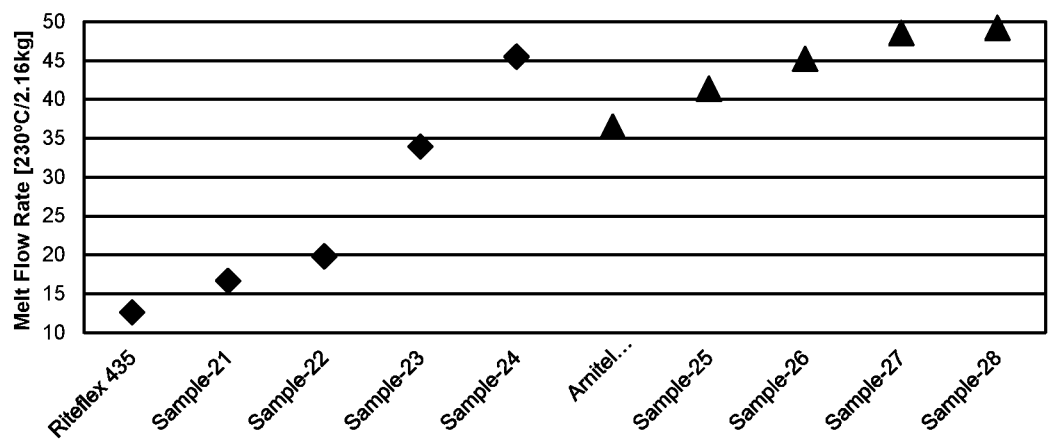
FIG. 4 is a graph of melt flow rate as a function of styrenic polymer addition for the samples of Example 2.

FIGS. 1 and 3 indicate the samples demonstrated reduced hardness when Polymer X was added. The softest commercially available copolyesters were used in the samples described in FIG. 1. The hardness could be decreased to 66 Shore A. FIGS. 2 and 4 demonstrates the melt flow rate gradually increased up to 50 g/10 min. at 230° C./2.16 kg.

Table 8 shows high elongation at break values for Riteflex 425 and Arnitel EL250 blends greater than 850% and for Hytrel 3046 blends greater than 700%. The tensile strength at break for Riteflex 435 blends is around 18.5 MPa, for Arnitel EL250 blends around 21.5 MPa and for Hytrel 3046 blends around 10.5 MPa. No delamination could be observed during tensile testing. A compatibilizer is not needed for blends based on thermoplastic copolyesters and Polymer X. With the increased amount of Polymer X increased surface stickiness is observed.

Example 2

HF-CSBs of the type described herein were formulated as described in Tables 4-5 and prepared by twin screw extrusion. All formulations contain similar amounts of standard antioxidants, UV-stabilizers and <5% of a proprietary haptic additive. All ingredients were dried overnight and dry blended prior to extrusion. Formulating ingredients included Polymer X and either Riteflex 435 (thermoplastic copolyester, MFR of 13 g/10 min. 85 Shore A), Table 4 or Arnitel EM400 (thermoplastic copolyester, MFR of 36 g/10 min., 91 Shore A), Table 5.

TABLE 4

| | Sample No. | | | |
|---|---|---|---|---|
| | 21 | 22 | 23 | 24 |
| Riteflex 435 | 85.03 wt. % | 70.85 wt. % | 47.13 wt. % | 23.56 wt. % |
| Polymer X | 9.45 wt. % | 23.62 wt. % | 47.13 wt. % | 70.69 wt. % |

TABLE 5

| | Sample No. | | | |
|---|---|---|---|---|
| | 25 | 26 | 27 | 28 |
| Arnitel EM 400 | 85.03 wt. % | 70.85 wt. % | 47.13 wt. % | 23.56 wt. % |
| Polymer X | 9.45 wt. % | 23.62 wt. % | 47.13 wt. % | 70.69 wt. % |

The melt flow rates on all copolyesters and all blends were tested according to ASTM D1238 at 230° C./2.16 kg. Shore A hardness were tested according ISO 868 on injection molded plates at 10 seconds. Tensile properties were measured according to ASTM D638-10 on specimen type D412-72 Type D with a cross-head speed of 10 inch/min. The specimens were cut out of injection molded plates prior to testing. Tear strength was measured according ASTM D624 on specimens D624-54 Type C with a cross-head speed of 10 inch/min. The test specimens were cut out of injection molded plates prior to testing. Taber abrasion following ASTM D3389 was measured on injection molded plates based on 1000 cycles and 500 g weight. The weight of the plate was determined before and after the abrasion test. No loss in weight could be measured. The static coefficient of friction measured by ASTM D1894 was used as one method to measure the difference of the neat copolyesters and the optimized copolyesters/Polymer X blends.

FIG. 3 demonstrates the decrease in hardness of Riteflex 435 and Arnitel EM400 blends by adding 10%-weight, 25%-weight, 50%-weight and 70%-weight Polymer X. Hardness could be decreased down to Shore A 52. FIG. 4 shows the melt increase by adding Polymer X. The melt flow rate of the Riteflex 435 blends increased from 13 g/10 min to 46 g/10 min. The melt flow rate of Arnitel EM400 increased from 37 g/10 min. to 49 g/10 min. Table 7 shows decreasing tensile strength values for the Riteflex 435 blends from 17 MPa down to 9 MPa and for the Arnitel EM400 blends from 13 MPa down to 9 MPa depending on the addition of Polymer X. Elongations at break of all blends were greater than 1000%. Tear strength values of both blend families went from 94 kN/m down to 32 kN/m.

Figure 5:
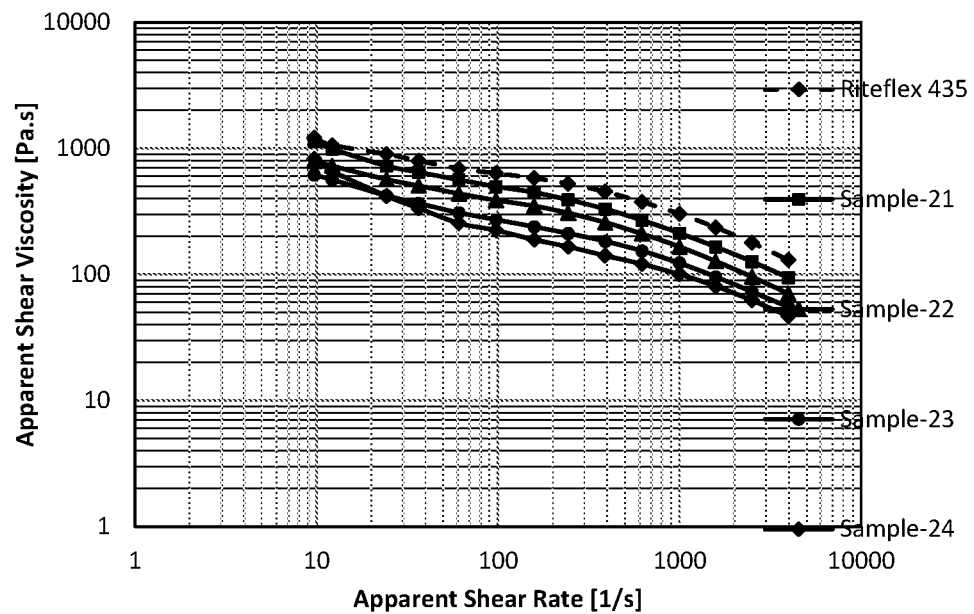
FIG. 5 is a plot of the capillary viscosity of samples from Example 2.

Capillary viscosity was determined according to ASTM D3835 at 230° C. using a die with a diameter of 1.0 mm and a length of 20 mm. Polymer X has a significant lower melt viscosity than other Kraton grades. FIG. 5 demonstrates the change of viscosity while adding Polymer X to Riteflex 435.

All blends showed no loss in weight after Taber abrasion test. The surface of the injection molded plates had a high gloss appearance before abrasion testing. The surface which was treated by the Taber wheel became dull after testing. The coefficient of friction was used as a quantitative measurement for haptics perception. The neat copolyesters as well as the pure copolyesters/Polymer X blends are tacky to the touch. The experimental compounds within this study containing the haptics additive have in contrast a smooth and silky & feel appearance. Table 6 shows a significant decrease of coefficient of friction values which correspond well to the touch and feel observations of the samples. Tables 7 and 8 provide additional results on various measured properties of Sample Nos. 1-24.

TABLE 6

| Riteflex 435 | 1.68 | tacky | Arnitel EM400 | 1.00 | tacky |
|---|---|---|---|---|---|
| Sample-21 | 0.19 | silky | Sample-25 | 0.16 | silky |
| Sample-22 | 0.20 | silky | Sample-26 | 0.18 | silky |
| Sample-23 | 0.37 | silky | Sample-27 | 0.41 | silky |
| Sample-24 | 0.43 | silky | Sample-28 | 0.46 | silky |

TABLE 7

| Property | Unit | Method | Sample-1 | Sample-2 | Sample-5 | Sample-6 | Sample-7 | Sample-8 | Sample-9 | Sample-10 |
|---|---|---|---|---|---|---|---|---|---|---|
| Specific gravity | g/cm3 | ISO 1183 | 1.05 | 1.01 | 1.05 | 1.01 | 1.05 | 1.01 | 1.05 | 1.01 |
| Hardness | Shore A | ISO 868 | 72 | 66 | 88 | 72 | 78 | 69 | 86 | 72 |
| Shrinkage | % | | 1.5 | 1.5 | 1.5 | 1.5 | 1.5 | 1.5 | 1.5 | 1.5 |
| MFI 230° C./2.16 kg | g/10 min | ASTM D1238 | 41 | 47 | 21 | 32 | 46 | 50 | 41 | 47 |
| Tensile strength | MPa | DIN 53504 | 18.4 | 18.9 | 18.5 | 19.5 | 21.6 | 21.8 | 21.1 | 20.1 |
| Tensile stress at 100% | MPa | DIN 53504 | 3.3 | 2.6 | 8.8 | 5.1 | 4.8 | 3.4 | 6.6 | 4.4 |
| Tensile stress at 300% | MPa | DIN 53504 | 5.6 | 4.6 | 15.5 | 10.0 | 8.3 | 6.2 | 10.6 | 7.8 |
| Tensile stress at 500% | MPa | DIN 53504 | 8.9 | 7.7 | n.a. | 16.8 | 12.6 | 10.2 | 15.7 | 12.4 |
| Elongation at break | % | DIN 53504 | 984 | 889 | 415 | 578 | 859 | 853 | 707 | 753 |
| Taber abrasion | mg/1000 rev | ASTM D3389 | No wear | No wear | No wear | No wear | No wear | No wear | No wear | No wear |
| Tear strength | kN/m | ASTM D 624 | 55 | 35 | 105 | 57 | 68 | 42 | 83 | 53 |
| Coefficient of friction | | ASTM D1894 | >2.0 | >2.0 | >2.0 | >2.0 | >2.0 | >2.0 | >2.0 | >2.0 |
| Property | Unit | Method | Sample-11 | Sample-12 | Sample-13 | Sample-14 | Sample-15 | Sample-16 | Sample-17 | Sample-18 |
| Specific gravity | g/cm3 | ISO 1183 | 1.05 | 1.01 | 1.05 | 1.01 | 1.05 | 1.01 | 1.05 | 1.01 |

TABLE 7-continued

| | | | | | | | | | | |
|---|---|---|---|---|---|---|---|---|---|---|
| Hardness | Shore A | ISO 868 | 93 | 77 | 77 | 68 | 88 | 74 | 96 | 81 |
| Shrinkage | % | | 1.5 | 1.5 | 1.5 | 1.5 | 1.5 | 1.5 | 1.5 | 1.5 |
| MFI 230° C./2.16 kg | g/10 min | ASTM D1238 | 14 | 31 | 34 | 42 | 19 | 29 | 27 | 34 |
| Tensile strength | MPa | DIN 53504 | 21.7 | 15.4 | 11.4 | 10.5 | 20.6 | 12.2 | 20.6 | 12.9 |
| Tensile stress at 100% | MPa | DIN 53504 | 12.1 | 6.2 | 3.2 | 2.3 | 4.4 | 2.9 | 9.3 | 4.9 |
| Tensile stress at 300% | MPa | DIN 53504 | 19.2 | 10.9 | 5.6 | 4.4 | 8.2 | 5.6 | 14.6 | 8.0 |
| Tensile stress at 500% | MPa | DIN 53504 | n.a. | n.a. | 8.0 | 7.0 | 12.9 | 9.5 | n.a. | 11.5 |
| Elongation at break | % | DIN 53504 | 375 | 467 | 754 | 722 | 753 | 662 | 470 | 555 |
| Taber abrasion | mg/1000 rev | ASTM D3389 | No wear | No wear | No wear | No wear | No wear | No wear | No wear | No wear |
| Tear strength | kN/m | ASTM D 624 | 109 | 58 | 58 | 38 | 75 | 48 | 127 | 70 |
| Coefficient of friction | | ASTM D1894 | 1.3 | 1.6 | >2.0 | >2.0 | >2.0 | >2.0 | 1.2 | 1.5 |

TABLE 8

| Property | Unit | Method | Sample-21 | Sample-22 | Sample-23 | Sample-24 | Sample-25 | Sample-26 | Sample-27 | Sample-28 |
|---|---|---|---|---|---|---|---|---|---|---|
| Specific gravity | g/cm3 | ISO 1183 | 1.07 | 1.05 | 1.01 | 0.97 | 1.07 | 1.05 | 1.01 | 0.97 |
| Hardness | Shore A | ISO 868 | 81 | 76 | 64 | 53 | 84 | 80 | 67 | 52 |
| Shrinkage | % | | 1.5 | 1.5 | 1.5 | 1.5 | 1.5 | 1.5 | 1.5 | 1.5 |
| MFI 230° C./2.16 kg | g/10 min | ASTM D1238 | 17 | 20 | 34 | 46 | 41 | 45 | 49 | 49 |
| Tensile strength | MPa | ASTM D638 | 17.1 | 15.5 | 11.9 | 9.2 | 13.6 | 10.6 | 8.4 | 9.0 |
| Tensile stress at 100% | MPa | ASTM D638 | 3.7 | 3.1 | 2.1 | 1.3 | 4.5 | 3.5 | 2.4 | 1.3 |
| Tensile stress at 300% | MPa | ASTM D638 | 5.2 | 4.4 | 3.1 | 2.0 | 6.0 | 4.8 | 3.5 | 2.1 |
| Tensile stress at 500% | MPa | ASTM D638 | 6.8 | 5.8 | 4.1 | 2.8 | 7.3 | 6.0 | 4.6 | 3.0 |
| Elongation at break | % | ASTM D638 | 1269 | 1288 | 1253 | 1193 | 1229 | 1105 | 1098 | 1193 |
| Taber abrasion | mg/1000 rev | ASTM D3389 | No wear | No wear | No wear | No wear | No wear | No wear | No wear | No wear |
| Tear strength | kN/m | ASTM D624 | 94 | 78 | 51 | 32 | 94 | 80 | 53 | 33 |
| Coefficient of friction | | ASTM D1894 | 0.19 | 0.20 | 0.37 | 0.43 | 0.16 | 0.18 | 0.41 | 0.46 |

The results demonstrated that a HF-CSB of the type disclosed herein prepared with a controlled distribution styrenic block copolymer, also of the type disclosed herein, displayed compatibility with a variety of copolyesters. The resultant blends also showed decrease hardness and increased melt flow rate without the addition of a plasticizer.

Example 3

An HF-CSB of the type disclosed herein was used to prepare an overmolding and the peel adhesion strength of the overmoulding tested. The test procedure used to determine overmolding adhesion was DIN EN ISO 8510-2: Peel test for a flexible-bonded-to-rigid test specimen assembly—Part 2: 180 degree peel (ISO 8510-2:2006) A rigid substrates was used and an HF-CSB of the type disclosed herein was overmolded onto: polypropylene (PP), PP filled (natural fiber, mineral filler, glass fiber, glass beats, . . . ), acrylonitrile butadiene styrene (ABS) and acrylonitrile butadiene styrene/polycarbonate (ABS/PC). The peel adhesion values range of 180° peel adhesion from 25 N/25 mm to about 300 N/25 mm. The peel adhesion was measured with a cross-head speed of 200 mm/min.

The following are enumerated embodiments are provided as non-limiting examples.

A first embodiment which is a composition comprising (i) a controlled distribution styrenic block copolymer and (ii) a thermoplastic copolyester wherein the composition has a Shore A hardness of from about 50 to about 90 and a melt flow rate of from about 15 g/10 min. to about 50 g/10 min. as determined in accordance with ASTM D 1238.

A second embodiment which is the composition of the first embodiment wherein the controlled distribution styrenic block copolymer has a first block comprising a styrenic polymer, a midblock comprising a terpolymer, and an end block comprising a styrenic polymer.

A third embodiment which is the composition of any preceding embodiment wherein the controlled distribution styrenic block copolymer comprises styrene, alpha-methylstyrene, para-methylstyrene, vinyl toluene, vinylnaphthalene, para-butyl styrene or combinations thereof.

A fourth embodiment which is the composition of the third embodiment wherein the terpolymer comprises styrene and a conjugated diene.

A fifth embodiment which is the composition of the fourth embodiment wherein the conjugated diene comprises 1,3-butadiene, isoprene, piperylene, 2,3-dimethyl-1,3-butadiene, 1-phenyl-1,3-butadiene, or combinations thereof.

A sixth embodiment which is the composition of the second embodiment wherein the midblock comprises an ethylene/butadiene/styrene terpolymer.

A seventh embodiment which is the composition of any preceding embodiment wherein the a controlled distribution styrenic block copolymer has a polystyrene content of from about 20% to about 60%.

An eighth embodiment which is the composition of any preceding embodiment wherein the controlled distribution styrenic block copolymer has a melt flow rate of from about 1 g/10 min. to about 100 g/10 min. as determined in accordance with ASTM 1238 at 230° C. and 2.16 kg.

A ninth embodiment which is the composition of any preceding embodiment wherein the controlled distribution styrenic block copolymer has a Shore A hardness of from about 20 to about 90.

A tenth embodiment which is the composition of any preceding embodiment wherein the thermoplastic copolyester has a Shore D hardness of from about 22 to about 60.

An eleventh thermoplastic wherein the thermoplastic copolyester comprises at least one segment containing butylene terephthalate, tetramethylene terephthalate, or ethylene terephthalate units and a second segment containing poly(alkylene oxide) glycols having a total of about 3 to about 12 carbon atoms.

A twelfth embodiment which is the composition of any preceding embodiment wherein the thermoplastic copolyester comprises a copolymer of terephthalic acid and butane diol.

A thirteenth embodiment which is the composition of any preceding embodiment wherein the composition excludes a plasticizer, a flow promoter or combinations thereof.

A fourteenth embodiment which is the composition of the thirteenth embodiment wherein the plasticizer or flow promoter comprises mineral-based oil, treated distilled aromatic extract (TDAE), mild extract solvate (MES), residual aromatic extract (RAE), treated aromatic Extract (TAE), naphthenic oil, white oil, black naphthenic oil, vegetable oils, sunflower oil, carnauba oil, linseed oil, rape seed oil, derivatives thereof, or combinations thereof.

A fifteenth embodiment which is the composition of any preceding embodiment which when formed into a test specimen has a tear strength of from about 25 kN/m to about 145 kN/m as determined in accordance with ASTM D624.

A sixteenth embodiment which is the composition of any preceding embodiment which when formed into a test specimen has a static coefficient of friction of from about 0.15 to about 0.8 as determined in accordance with ASTM D1894.

A seventeenth embodiment which is the composition of any preceding embodiment which when formed into a test specimen has an elongation at break of from about 200% to about 1300% as determined in accordance with DIN 53504, An eighteenth embodiment which is the composition of any preceding embodiment which when formed into a test specimen has an elongation at break of greater than about 200% as determined in accordance with DIN 53504.

A nineteenth embodiment which is the composition of any preceding embodiment which when formed into a test specimen has a peel adhesion of from about 25 N/25 mm to about 300 N/25 mm as determined in accordance with ISO 8510-2.

A twentieth embodiment which is an overmolding prepared from the composition of any preceding embodiment.

The terms "a," "an," and "the" are intended, unless specifically indicated otherwise, to include plural alternatives, e.g., at least one. Herein, while compositions and processes are described in terms of "comprising" various components or steps, the compositions and methods can also "consist essentially of" or "consist of" the various components or steps. A particular feature of the disclosed subject matter can be disclosed as follows: Feature X can be A, B, or C. It is also contemplated that for each feature the statement can also be phrased as a listing of alternatives such that the statement "Feature X is A, alternatively B, or alternatively C" is also an embodiment of the present disclosure whether or not the statement is explicitly recited.

While various aspects of the present disclosures have been shown and described, modifications thereof can be made by one skilled in the art without departing from the spirit and teachings of the disclosure. The aspects of the present disclosures described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present disclosure of the present disclosure. Thus, the claims are a further description and are an addition to the aspect of the present disclosures of the present disclosure. The discussion of a reference in the present disclosure is not an admission that it is prior art to the present disclosure, especially any reference that may have a publication date after the priority date of this application. The present disclosures of all patents, patent applications, and publications cited herein are hereby incorporated by reference, to the extent that they provide exemplary, procedural or other details supplementary to those set forth herein.

The invention claimed is:

1. A composition consisting essentially of (i) a controlled distribution styrenic block copolymer and (ii) a thermoplastic copolyester wherein the composition has a Shore A hardness of from about 50 to about 90 and a melt flow rate of from about 15 g/10 min. to about 50 g/10 min. as determined in accordance with ASTM D 1238;
wherein the thermoplastic copolyester comprises at least one segment containing butylene terephthalate, tetramethylene terephthalate, or ethylene terephthalate units and at least one segment containing poly(alkylene oxide) glycols having a total of about 3 to about 12 carbon atoms;
wherein the controlled distribution styrenic block copolymer has a melt flow rate of greater than 30 g/10 min. as determined in accordance with ASTM 1238 at 230° C. and 2.16 kg.

2. The composition of claim 1 wherein composition comprises about 50 to about 79 wt. % of the thermoplastic copolyester and about 21 to about 50 wt. % of the controlled distribution styrenic block copolymer based on the total weight of the composition; and wherein the controlled distribution styrenic block copolymer has a first block comprising a styrenic polymer, a midblock comprising a terpolymer, and an end block comprising a styrenic polymer.

3. The composition of claim 1 wherein the controlled distribution styrenic block copolymer comprises styrene, alpha-methylstyrene, para-methylstyrene, vinyl toluene, vinylnaphthalene, para-butyl styrene or combinations thereof.

4. The composition of claim 2 wherein the terpolymer comprises styrene and a conjugated diene.

5. The composition of claim 4 wherein the conjugated diene comprises 1,3-butadiene, isoprene, piperylene, 2,3-dimethyl-1,3-butadiene, 1-phenyl-1,3-butadiene, or combinations thereof.

6. The composition of claim 2 wherein the midblock comprises an ethylene/butadiene/styrene terpolymer.

7. The composition of claim 1 wherein the controlled distribution styrenic block copolymer has a polystyrene content of from about 20% to about 60%.

8. The composition of claim 1 wherein the controlled distribution styrenic block copolymer has a melt flow rate of from about 40 g/10 min. to about 100 g/10 min. as determined in accordance with ASTM 1238 at 230° C. and 2.16 kg.

9. The composition of claim 1 wherein the controlled distribution styrenic block copolymer has a Shore A hardness of from about 20 to about 90.

10. The composition of claim 1 wherein the copolyester has one or both of a Shore D hardness of from about 22 to about 60 or a Shore A hardness of about 76 to about 97.

11. The composition of claim 1 wherein the thermoplastic copolyester comprises the butylene terephthalate.

12. The composition of claim 1 wherein the composition excludes a plasticizer, a flow promoter or combinations thereof.

13. The composition of claim 12 wherein the plasticizer or flow promoter comprises mineral-based oil, treated distilled aromatic extract (TDAE), mild extract solvate (MES), residual aromatic extract (RAE), treated aromatic extract (TAE), naphthenic oil, white oil, black naphthenic oil, vegetable oils, sunflower oil, carnauba oil, linseed oil, rape seed oil, derivatives thereof, or combinations thereof.

14. The composition of claim 1 which when formed into a test specimen has a tear strength of from about 25 kN/m to about 145 kN/m as determined in accordance with ASTM D624.

15. The composition of claim 1 which when formed into a test specimen has a static coefficient of friction when sliding over itself of from about 0.15 to about 0.8 as determined in accordance with ASTM D1894.

16. The composition of claim 1 which when formed into a test specimen has an elongation at break of from about 200% to about 1300% as determined in accordance with DIN 53504.

17. The composition of claim 1 which when formed into a test specimen has an elongation at break of greater than about 200% as determined in accordance with DIN 53504.

18. The composition of claim 1 which when formed into a test specimen has a peel adhesion of from about 25 N/25 mm to about 300 N/25 mm as determined in accordance with ISO 8510-2.

19. An overmolding prepared from the composition of claim 1.

20. A composition comprising:
(i) about 21 to about 50 wt. % based on the total weight of the composition of a controlled distribution styrenic block copolymer having a first block comprising a styrenic polymer, a midblock comprising a terpolymer, and an end block comprising a styrenic polymer; wherein the controlled distribution styrenic block copolymer has a polystyrene content of from about 20% to about 60%; wherein the controlled distribution styrenic block copolymer has a melt flow rate of from about 1 g/10 min. to about 100 g/10 min. as determined in accordance with ASTM 1238 at 230° C. and 2.16 kg and a Shore A hardness of from about 20 to about 90; and
(ii) about 50 to about 79 wt. % based on the total weight of the composition a thermoplastic copolyester comprising at least one segment containing butylene terephthalate, tetramethylene terephthalate, or ethylene terephthalate units and at least one segment containing poly(alkylene oxide) glycols having a total of about 3 to about 12 carbon atoms; wherein the copolyester has a melt flow rate of 9 to 39 g/10 min;
wherein the composition excludes a plasticizer, a flow promoter, or combinations thereof and has a melt flow rate of from about 15 g/10 min. to about 50 g/10 min. as determined in accordance with ASTM D 1238;
wherein the composition has a Shore A hardness of from about 50 to about 90.

\* \* \* \* \*